(12) United States Patent
Han et al.

(10) Patent No.: US 7,865,056 B2
(45) Date of Patent: Jan. 4, 2011

(54) METHOD OF CONTROLLING SPECIAL PLAYBACK MODE OF VIDEO SIGNAL REPRODUCING APPARATUS

(75) Inventors: Yeon-Taek Han, Suwon (KR); Kuen-Pyo Hong, Suwon (KR)

(73) Assignee: Samsung Electronics Co., Ltd, Suwon-si (KR)

(*) Notice: Subject to any disclaimer, the term of this patent is extended or adjusted under 35 U.S.C. 154(b) by 650 days.

(21) Appl. No.: 10/994,668

(22) Filed: Nov. 23, 2004

(65) Prior Publication Data

US 2005/0069290 A1    Mar. 31, 2005

Related U.S. Application Data

(62) Division of application No. 09/583,758, filed on May 31, 2000, now Pat. No. 6,871,005.

(30) Foreign Application Priority Data

| May 31, 1999 | (KR) | ................................... 99-19774 |
| May 31, 1999 | (KR) | ................................... 99-19775 |
| Jun. 8, 1999 | (KR) | ................................... 99-21147 |

(51) Int. Cl.
   *H04N 5/91* (2006.01)

(52) U.S. Cl. .............................. 386/68; 386/70; 386/95
(58) Field of Classification Search ............. 386/68–70, 386/95, 46, 125, 126
See application file for complete search history.

(56) References Cited

U.S. PATENT DOCUMENTS

2003/0113096 A1*   6/2003   Taira et al. .................... 386/46

* cited by examiner

*Primary Examiner*—Vincent Boccio
(74) *Attorney, Agent, or Firm*—Stanzione & Kim, LLP

(57) ABSTRACT

A method of controlling a run mode of a video signal recording/reproducing apparatus is provided. More particularly, a method of controlling a special playback mode of a video signal reproducing apparatus, by rejecting a special playback key input during comparison of program classes in an initial playback mode, and restricting run of a special playback mode while a video signal loaded with program class data is being reproduced, is provided. The special playback key command, which is input while the video signal with program class data is being reproduced, is refused, thereby preventing pictures from being output regardless of program class, because the program class cannot be exactly detected in a special playback mode.

5 Claims, 4 Drawing Sheets

METHOD OF CONTROLLING SPECIAL PLAYBACK MODE OF VIDEO SIGNAL REPRODUCING APPARATUS

CROSS-REFERENCE TO RELATED APPLICATIONS

Pursuant to 37 CFR §1.78, this application is a divisional of, makes reference to, incorporates the same herein and claims all benefits accruing under 35 U.S.C. §120 and §121 from my application entitled METHOD OF CONTROLLING SPECIAL PLAYBACK MODE OF VIDEO SIGNAL REPRODUCING APPARATUS filed in the United States Patent & Trademark Office on the 31$^{st}$ day of May in the year 2000 and there assigned Ser. No. 09/583,758, now U.S. Pat. No. 6,871,005.

CLAIM OF PRIORITY

This application makes reference to, incorporates the same herein, and claims all benefits accruing under 35 U.S.C. §119 from my applications entitled (1) Method for Controlling Special Playback Mode according to Detection of Classified Program Data filed with the Korean Industrial Property Office on 31 May 1999 there duly assigned Serial No. 19774/1999, (2) Method for Controlling a Special Playback Picture according to Detection of Classified Program Data filed with the Korean Industrial Property Office on 31 May 1999 and there duly assigned Serial No. 19775/1999, and (3) Method for Controlling Output of Program Restrictively filed with the Korean Industrial Property Office on 8 Jun. 1999 and there duly assigned Serial No. 21147/1999.

BACKGROUND OF THE INVENTION

1. Field of the Invention

The present invention relates to a method of controlling an operation mode of a video signal recording/reproducing apparatus, and more particularly, to a method of controlling a special playback mode of a video signal reproducing apparatus, by rejecting a special playback key input during comparison of program classes in an initial playback mode and restricting operation of a special playback mode while a video signal loaded with program class data is being reproduced.

2. Description of the Related Art

Conventionally, a broadcasting station transmits video and audio signals of a broadcasting program. Televisions receive the signals, demodulate the video and audio signals, and output the video signal through monitors and the audio signal through speakers. These are the basic functions of televisions.

However, as the various functions of televisions have been developed, a broadcasting station loads additional information on video and audio signals when transmitting the video and audio signals. For example, a broadcasting station embeds information on a television program in a specified portion of a video signal, in which video is not output, to make reserved recording easier, before transmitting the video signal. A receiving party extracts the program information embedded in the video signal so that a user can conveniently set reserved recording and find a desired program by checking the broadcasting order of each broadcasting station at any time, due to the information.

Moreover, a broadcasting station classifies broadcasting programs into, for example, programs allowed for only adults and programs which whole families can enjoy together, based on their contents, and loads this information on the class of a program onto the information about the program embedded in the video signal.

Accordingly, when playing a VCR tape on which a program, which has data indicating the class, or rating, of the program in a specified area of a video signal, is recorded, in a normal playback mode, program class data added to the video signal is extracted and compared with a program class selected by a user so that blanking/non-blanking of pictures can be determined.

According to conventional technology, however, when a special playback key (for example, a fast playback key) is input a predetermined time before a key for reproducing a tape, on which a video signal having program class data is recorded, is input, and a video signal reproducing apparatus operates in the special playback mode, the program class data added to the video signal cannot be normally extracted so that class comparison cannot be performed.

In addition, when reproducing a video signal having program class data in a special playback mode, the program class data added to the video signal cannot be exactly extracted due to the tracing characteristic of a track so that a problem can occur wherein the pictures of the video signal are output regardless of the recorded program class.

SUMMARY OF THE INVENTION

To solve the above problem, an object of the present invention is to provide a method of controlling a special playback mode of a video signal reproducing apparatus by rejecting the input of a special playback key for a period of time necessary for extracting and comparing program class data with a selected class, starting from the start of a playback mode, and restricting operation of a special playback mode while a video signal having the program class data is reproduced.

To achieve the above object of the invention, in a first embodiment, there is provided a method of controlling a special playback mode of a video signal reproducing apparatus. The method includes the steps of (a) determining whether the video signal reproducing apparatus is controlled to operate in a normal playback mode, (b) determining whether a time, which is necessary for detecting program class data and determining a class, lapses starting from a time when the normal playback mode begins, and (c) refusing a predetermined special playback key command when the time necessary for determining a program class has not lapsed based on the determination in step (b).

In a second embodiment, there is provided a method of controlling a special playback mode of a video signal reproducing apparatus. The method includes the steps of (a) determining whether program class data is detected from a video signal reproduced by the video signal reproducing apparatus in a normal playback mode, and (b) interrupting an operation corresponding to a predetermined special playback key command, generated by a user's key input, until after the program class data is detected in the step (a).

In a third embodiment, there is provided a method of controlling a special playback mode of a video signal reproducing apparatus. The method includes the steps of (a) determining whether program class data is detected from a video signal reproduced by the video signal reproducing apparatus in a normal playback mode, and (b) blocking output of reproduced pictures when a predetermined special playback key command is input by a user's key operation before the program class data is detected in the step (a).

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
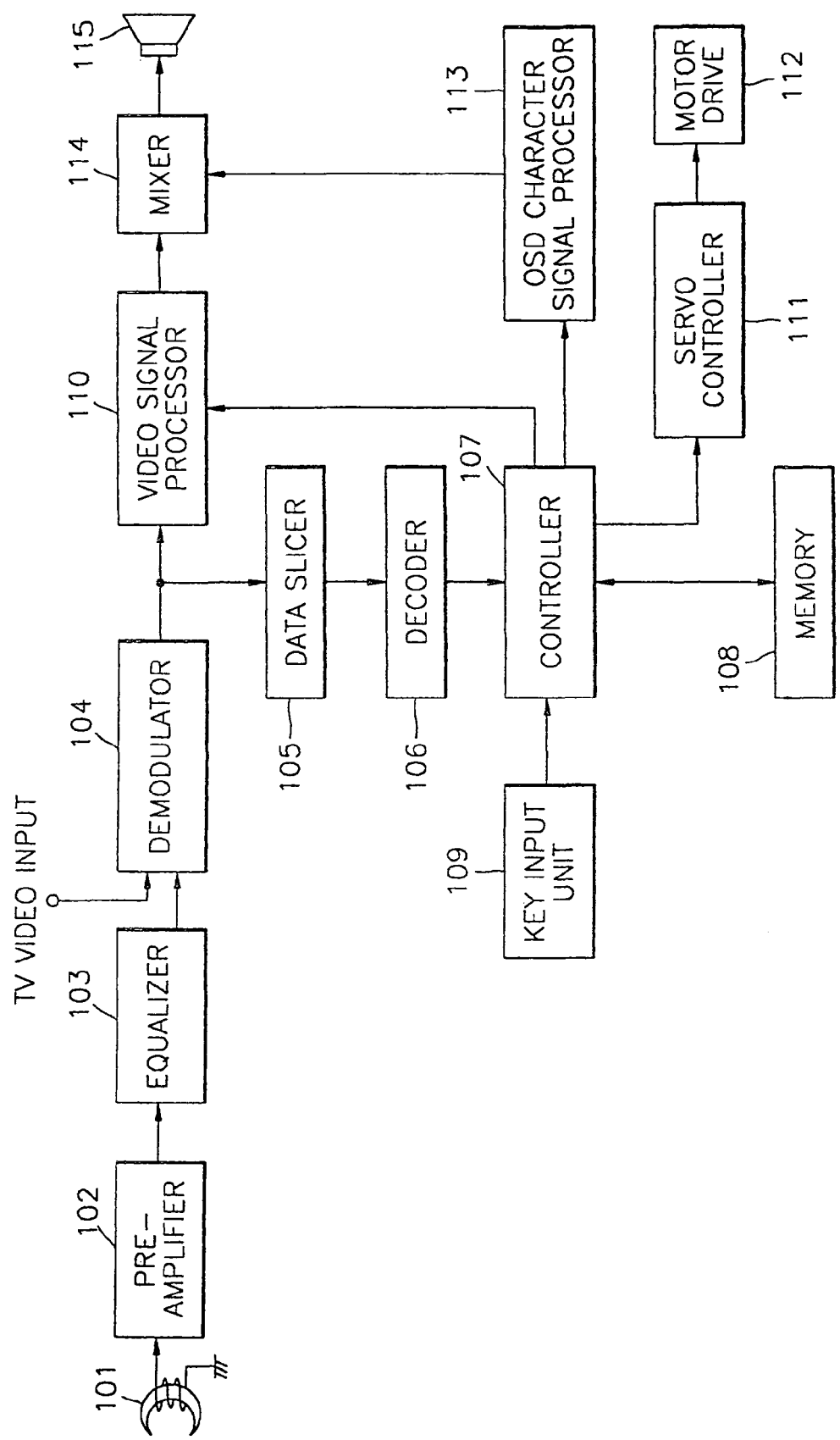
FIG. 1 is a block diagram of a video signal recording/reproducing apparatus to which the present invention is applied.

FIG. 1 is a block diagram of a TVCR (a combination of TV and VCR) which is an example of a video signal recording/reproducing apparatus to which the present invention is applied. A TVCR includes a video head 101, a pre-amplifier 102, an equalizer 103, a demodulator 104, a data slicer 105, a decoder 106, a controller 107, a memory 108, a key input unit 109, a video signal processor 110, a servo controller 111, a motor drive 112, an on-screen display (OSD) character signal processor 113, a mixer 114 and a cathode-ray tube 115.

Figure 2:
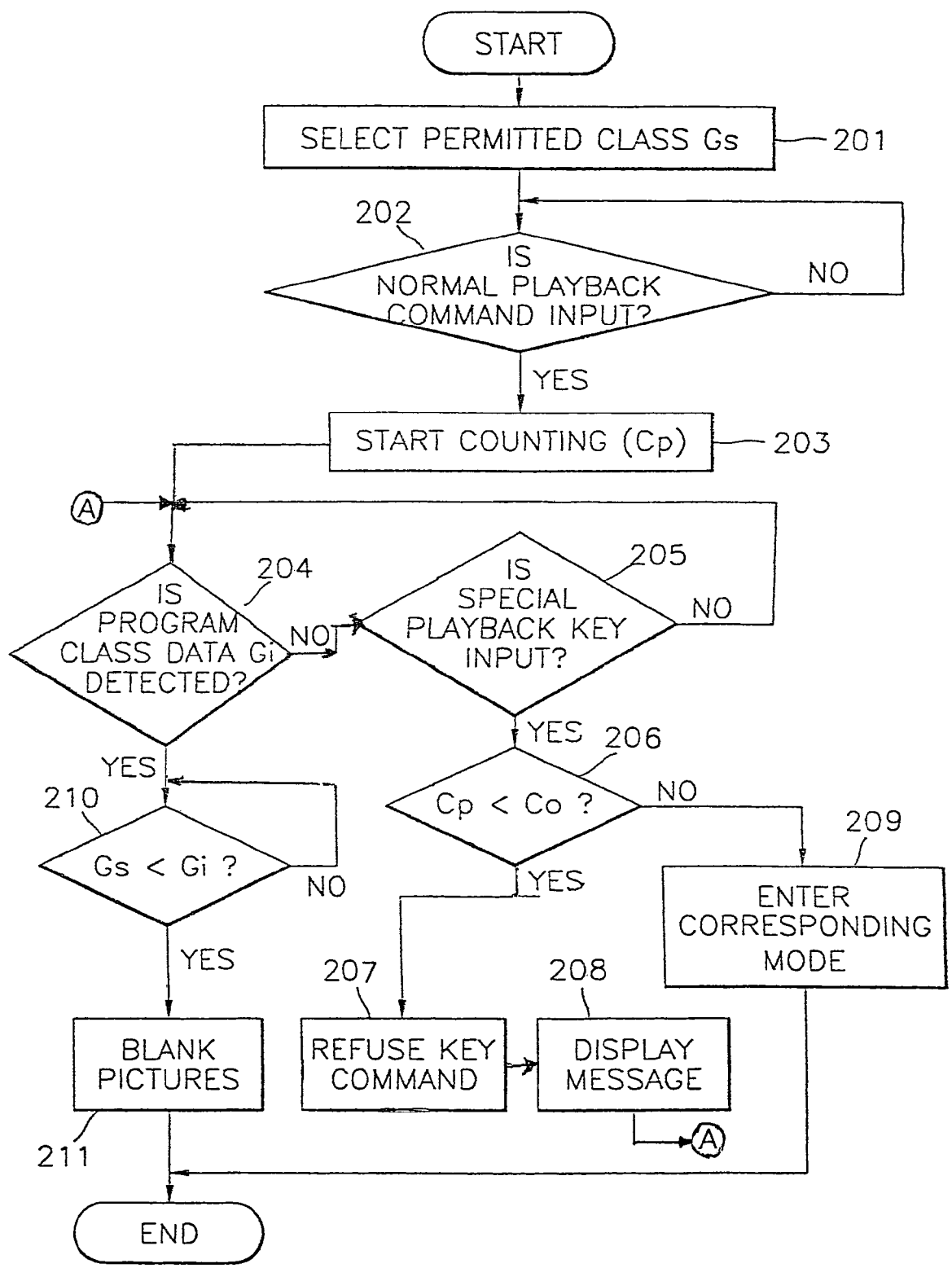
FIG. 2 is a flowchart of a method of controlling a special playback mode of a video signal reproducing apparatus according to a first embodiment of the present invention.

Referring to FIGS. 1 and 2, a first embodiment of the present invention will now be described in detail.

In step 201, a user selects one program class Gs among several receivable program classes, which are classified based on age and on the contents of a program, which is sent from a broadcasting station or which is reproduced, through the key input unit 109. The defined classes of programs are divided into ALL→G→PG→PG-13→R→NC-17→X→NR. The class ALL is the lowest program class, given to programs which are suitable for anybody to watch, regardless of setting a class. The class NR is the highest program class, given to programs which only adults of a certain age or older are permitted to watch.

Accordingly, when the user wishes to normally output only programs of the PG-13 class or lower through the cathode-ray tube 111, the user can select PG-13 as the permitted program class Gs by operating function keys provided in the key input unit 109.

In step 202, it is determined whether a command for a normal playback mode is input to the controller 107. In other words, it is determined whether a normal playback key is input in a stop mode in which a tape is steadily loaded into a TVCR deck. Alternatively, when the user loads a tape into the TVCR deck in a tape off mode, it is determined whether the command for the playback mode is automatically generated after a tape off, or tape out, mode according to a typical automatic playback function.

No other mode is permitted until it is determined that the command for the normal playback mode is input in step 202. When it is determined that the command for the normal playback mode is sequentially input after the stop mode or the tape off mode in step 202, a counter Cp (now shown) within the controller 107 starts counting from the point when the mode is converted to the normal playback mode, to measure time in step 203. After starting the counter, it is determined whether the program class data embedded in the reproduced video signal is detected in step 204.

The following description concerns a method of detecting program class data. A video signal from a recording medium is detected as an electrical signal by the video head 101 of a TVCR. Since the level of the electrical signal detected by the video head 101 is very small, the electrical signal is amplified to have a predetermined gain, by the pre-amplifier 102, to facilitate signal processing.

The equalizer 103 equalizes the waveform of the amplified video playback signal and boosts a high frequency band, which has been attenuated due to the characteristics of recording/playback signal processing, to compensate for the attenuation. The demodulator 104 divides the input video playback signal into a luminance signal and a chrominance signal and demodulates the signals according to respective signal standards. The same demodulation method is used when an input signal is not a video playback signal but a video signal received by a television set. The data slicer 105 receives the demodulated video signal and separates program class data Gi only, which is embedded in a horizontal synchronization signal at a specified position, using a masking pulse. The decoder 106 converts the separated program class data signal into digital data and outputs the digital data to the controller 107. Accordingly, it is determined whether the program class data is detected from the reproduced video signal by determining whether the program class data is input to the input terminal of the controller 107.

When it is determined that the program class data has not yet been detected in step 204, then in step 205, it is determined whether a command of a special playback key is input through the user's operation of the key input unit 109. Some examples of commands for several special playback modes are, a search key command, a fast forward command, a slow key command and a still key command included in the commands. According to the present invention, the special playback mode is defined as any mode other than the normal playback mode and a normal rewind mode. A normal rewind mode is defined as a mode that controls the rewinding of the tape without displaying any pictures during the rewind operation. A rewind mode that includes the display of pictures is considered to be a special playback mode.

When it is determined that the special playback key is input in step 205, the value of the counter Cp is compared, in step 206, with an initially set value Co. The initially set value Co corresponds to a period of time which is necessary for extracting program class data Gi from a reproduced video signal in order to compare the program class data Gi with the selected program class Gs, starting from a point when the normal playback key command is input. For example, the initially set value Co may be set to a time of 5 seconds, which would be defined by U.S. Federal Communication Commission (FCC). That is, the program class data Gi should be extracted from the reproduced video signal with in 5 seconds, for example, after the start of the normal playback mode.

In step 207, the operation of the input special playback key command is refused when the value of the counter Cp is smaller than the initially set value Co. This is because special playback pictures are normally displayed regardless of program class when an operation corresponding to the input special playback command is executed before program class data is completely extracted and compared with the selected class in the normal playback mode, thus pictures of higher classes than the selected program class cannot be blocked. In order to prevent this from happening, the execution of the special playback key command is refused in step 207.

More specifically, when the special playback command is input to the controller 107, a control operation corresponding to the special playback command is not executed and is interrupted, and a normal playback command is output to the servo controller 111 to continue the normal playback mode. Accordingly, when the special playback key command is input during the period of time necessary for extracting program class data in the initial stage of the normal playback mode, i.e., during the initial 5 second playback interval, the input special playback command is refused in step 207, and the normal playback mode is continued.

Such control of a special playback mode may be programmed and stored in the memory 108 to allow the user to select to execute the control at the user's option.

While the input special playback key command is refused, the controller 107 controls the OSD character signal processor 113 to output a message signal to mixer 114 which explains that an operation corresponding to the input key is not performed, or not permitted, at this time, to display the OSD message through the cathode-ray tube 115, in step 208. This is for preventing the user from thinking that the TVCR is malfunctioning because an operation corresponding to the input key is not performed. The message may remain on displayed the screen of the cathode-ray tube 115 for the until a program class is determined in step 204.

When it is determined in step 207 that the value of the counter Cp is equal to or greater than the initially set value Co, the input special playback is allowed to be performed in step 209, because the time necessary for the comparison of program classes has lapsed.

In step 210, the program class data Gi, which has been detected and input to the controller 107 in step 204, is compared with the program class Gs, which was selected by the user in step 201. In other words, the controller 107 determines which one of the selected program class Gs and the received program class Gi is higher. The user has no time to operate the a special playback mode time between detection of program class data Gi in step 204 and obtaining the comparison result in step 210.

When it is determined that the selected program class Gs is lower than the received program class Gi in step 210, the video signal processor 110 is controlled in step 211 to block the video signal so that the video signal cannot be output through the mixer 110 and the cathode-ray tube 111, because the reproduced program is defined as a program which is not permitted to be watched.

On the other hand, when it is determined in step 210 that the selected program class Gs is equal to or higher than the received program class Gi, pictures are normally output instead of being blanked, because the reproduced program is defined as a program which is permitted to be watched.

Figure 3:
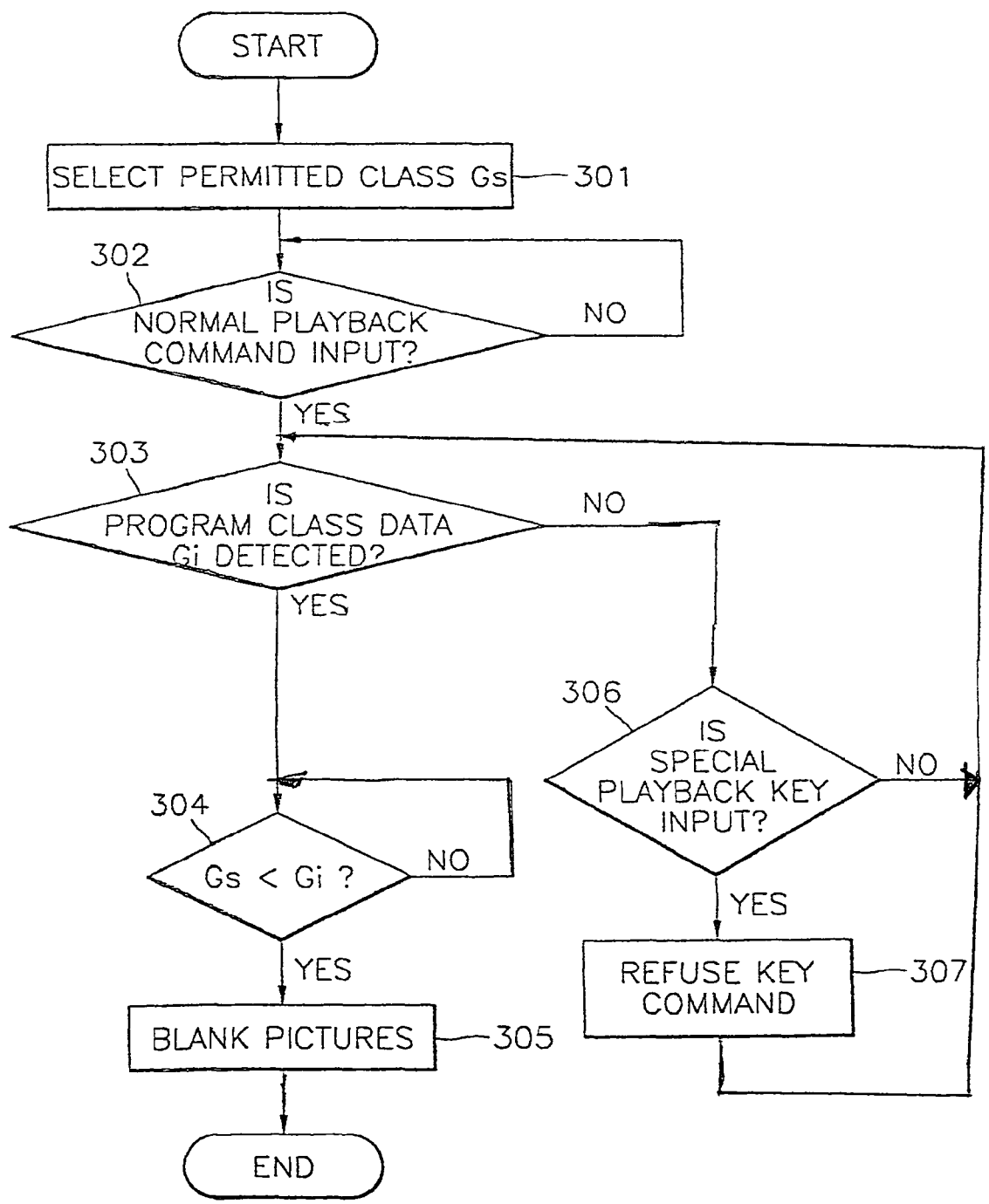
FIG. 3 is a flowchart of a method of controlling a special playback mode of a video signal reproducing apparatus according to a second embodiment of the present invention.

With reference to FIGS. 1 and 3, a second embodiment of the present invention will now be described when there is no set time period within which the program class data Gi should be extracted from the reproduced video signal after the start of the normal playback mode.

Steps 301 and 302 are the same as steps 201 and 202 described in the first embodiment, and thus descriptions thereof will be omitted.

When it is determined that a normal playback command is input in step 302, it is determined whether program class data is detected from a reproduced video signal in step 303. A method of detecting program class data has been described in detail in the first embodiment, and thus a description thereof will be omitted.

In step 304, program data Gi, which is detected and input to the controller 107 in step 303, is compared with a program class Gs, which is selected by a user in step 301. In other words, the controller 107 determines which is higher, the selected program class Gs or the received program class Gi.

When it is determined that the selected program class Gs is lower than the received program class Gi in step 304, the video signal processor 110 is controlled to block the video signal so that the video signal cannot be output through the mixer 110 and the cathode-ray tube 111 in step 305, because the reproduced program is defined as a program which is not permitted to be watched.

On the other hand, when it is determined that the selected program class Gs is equal to or higher than the received program class Gi in step 304, pictures are normally output instead of blanking pictures, because the reproduced program is defined as a program which is permitted to be watched.

While the program class data is being detected in step 303, it is determined whether a command of a special playback key is input in step 306. Whether the input key command corresponds to a special playback command is determined with reference to a special playback key command list which is stored in the memory 108, as described with respect to step 205 of the first embodiment.

When it is determined that the key command input to the controller 107 is a special playback command in step 306, a control operation corresponding to the special playback command is refused, or interrupted, in step 307, and step 303 is continued in the normal playback mode. Note that step 307 may include a step of displaying an on-screen message similar to step 208 of the first embodiment. Briefly, when a special playback key command is input while program class data is being detected in a normal playback mode, the input special playback key command is refused, and the program class data continues to be searched for in the normal playback mode.

Such control of a special playback mode may be programmed and stored in the memory 108 to allow the user to select to execute the control at his/her option when a video signal having program class data is reproduced.

Figure 4:
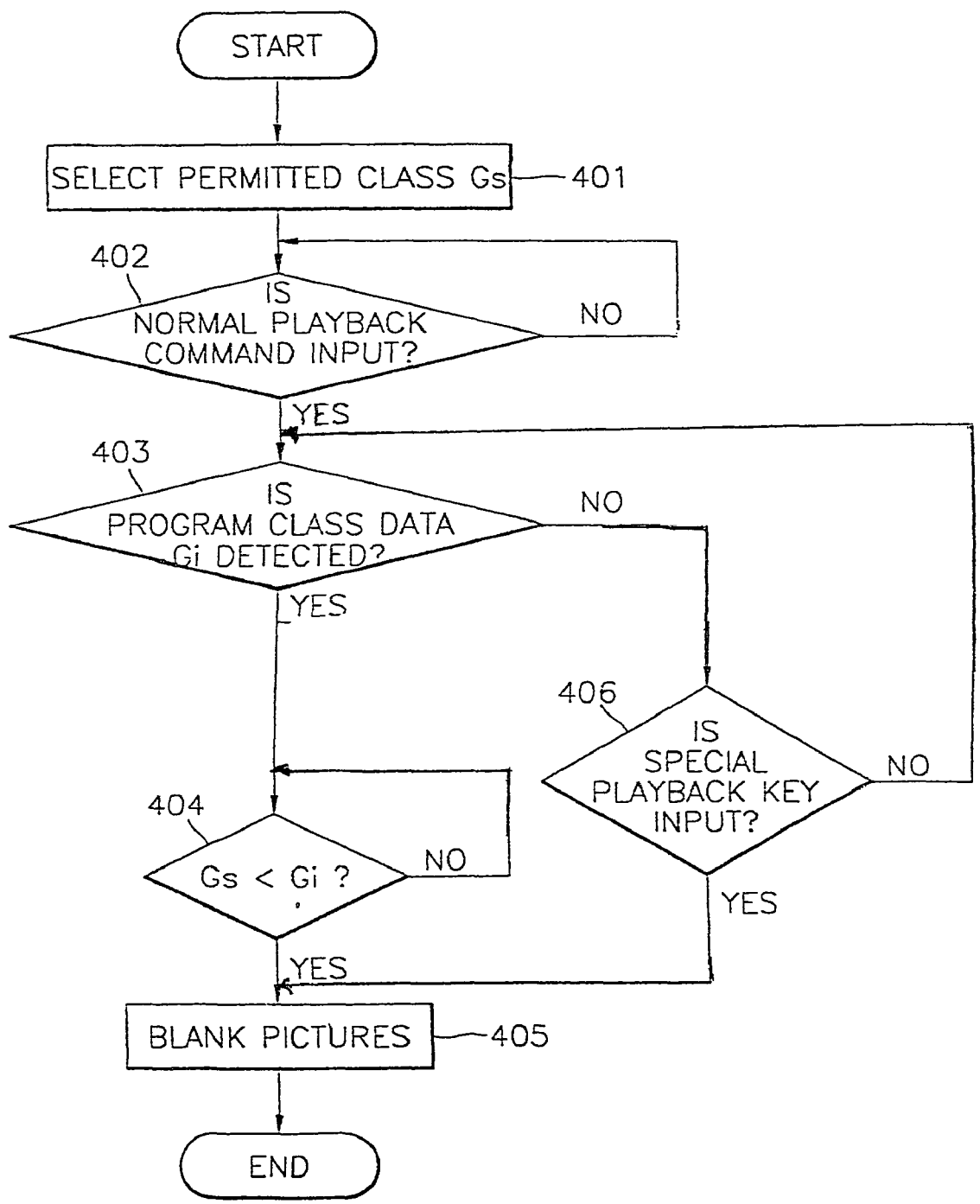
FIG. 4 is a flowchart of a method of controlling a special playback mode of a video signal reproducing apparatus according to a third embodiment of the present invention.

Finally, a third embodiment of the present invention will be described with reference to FIGS. 1 and 4.

Steps 401 through 405 are the same as the steps 301 through 305 described in the second embodiment. While the program class data is being detected in step 403, it is determined whether a command of a special playback key is input in step 406. Instead of refusing the special playback key command as in step 307 of the second embodiment, in the third embodiment, step 405 of blanking output pictures is performed when the controller 107 determines that a key command corresponding to a special playback key is input in step 406 prior to the successful detection of the program class data Gi.

The second and third embodiments have described have been described taking into consideration that no set time period has been set within which the program class data Gi should be extracted from the reproduced video signal after the start of the normal playback mode when using a tape having the embedded program class data, however, if a tape having no program class data is played back, then it may be desired to set a time period so that operation of a special playback function is not refused after the time period has elapsed as described with respect to the first embodiment. A TVCR is taken as an example in the described embodiments of the present invention, but it will be apparent to those skilled in the art that the present invention can be applied to analog VCRs and digital VCRs.

As described above, the present invention refuses a special playback key command, which is input while a video signal with program class data is being reproduced, thereby preventing pictures from being output regardless of program class because the program class cannot be exactly detected in a special playback mode.

What is claimed is:

1. A method of controlling special playback modes of a video signal reproducing apparatus, the method comprising:
   detecting a command to initiate a normal playback mode;
   setting a counter to a predetermined value to correspond to a period of time necessary to detect and compare program class data to preselected program class data;
   determining whether the program class data is detected from a video signal reproduced by the video signal reproducing apparatus in the normal playback mode; and
   if a lapsed period of time from the detection of the command to initiate the normal playback mode is less than a period of time remaining on the counter, preventing an operation of any of said special playback modes corresponding to a predetermined special playback key command generated by a user's key input.

2. The method of claim 1, wherein a table of predetermined special playback key commands is stored in a memory, interrupt is invoked in said refusing step when a command corresponding to one among the commands in the table is input.

3. The method of claim 1, wherein the predetermined special playback key command is any command other than a normal playback command and a normal rewind command.

4. A method of controlling a special playback mode of a video signal reproducing apparatus, the method comprising the steps of:
   detecting a command to initiate a normal playback mode;
   setting a counter to a predetermined value to correspond to a period of time necessary to detect and compare program class data to preselected program class data;
   determining whether the program class data is detected from a video signal reproduced by the video signal reproducing apparatus in the normal playback mode; and
   if a lapsed period of time from the detection of the command to initiate the normal playback mode is less than a period of time remaining on the counter, blocking output of reproduced pictures when a predetermined special playback key command is input by a user's key operation.

5. The method of claim 4, wherein the predetermined special playback key command is a search key command, a slow key command or a still key command.

* * * * *